United States Patent
Shields et al.

(10) Patent No.: US 9,309,354 B2
(45) Date of Patent: Apr. 12, 2016

(54) THERMOSETTING COMPOSITION AND PROCESS FOR PREPARING FIBER-REINFORCED COMPOSITES

(75) Inventors: Nigel Shields, Terneuzen (NL); Martin Reimers, Buehl-Rittersbach (DE); Nikhil K. E. Verghese, Lake Jackson, TX (US); Timothy A. Morley, Horgen (CH); Marty J. Null, Austin, TX (US); Rajesh H. Turakhia, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 300 days.

(21) Appl. No.: 14/117,878

(22) PCT Filed: Jun. 6, 2012

(86) PCT No.: PCT/US2012/040987
§ 371 (c)(1),
(2), (4) Date: Nov. 15, 2013

(87) PCT Pub. No.: WO2012/177392
PCT Pub. Date: Dec. 27, 2012

(65) Prior Publication Data
US 2014/0213698 A1    Jul. 31, 2014

Related U.S. Application Data

(60) Provisional application No. 61/501,037, filed on Jun. 24, 2011.

(51) Int. Cl.
| | |
|---|---|
| C08L 63/00 | (2006.01) |
| C08G 59/62 | (2006.01) |
| C08G 59/56 | (2006.01) |
| B29C 70/40 | (2006.01) |
| C08K 7/06 | (2006.01) |
| B29C 70/44 | (2006.01) |
| B29C 70/48 | (2006.01) |
| B29K 63/00 | (2006.01) |

(52) U.S. Cl.
CPC ............. *C08G 59/621* (2013.01); *B29C 70/40* (2013.01); *C08G 59/56* (2013.01); *C08G 59/623* (2013.01); *C08K 7/06* (2013.01); *C08L 63/00* (2013.01); *B29C 70/44* (2013.01); *B29C 70/48* (2013.01); *B29K 2063/00* (2013.01)

(58) Field of Classification Search
CPC ...................................................... C08L 63/00
See application file for complete search history.

(56) References Cited

U.S. PATENT DOCUMENTS

| | | |
|---|---|---|
| 3,306,872 A | 2/1967 | Maycock et al. |
| 3,341,580 A | 9/1967 | Hechenbleikner |
| 3,379,684 A | 4/1968 | Wiesner et al. |
| 3,477,990 A | 11/1969 | Dante |
| 3,547,881 A | 12/1970 | Mueller et al. |
| 3,637,590 A | 1/1972 | Maycock et al. |
| 3,751,471 A | 8/1973 | Becker |
| 3,843,605 A | 10/1974 | Schmidt et al. |
| 3,948,855 A | 4/1976 | Perry |
| 3,954,762 A * | 5/1976 | Helm ............... C08G 59/56 252/182.13 |
| 3,956,237 A | 5/1976 | Doorakian et al. |
| 4,048,141 A | 9/1977 | Doorakian et al. |
| 4,093,650 A | 6/1978 | Doorakian et al. |
| 4,131,633 A | 12/1978 | Doorakian et al. |
| 4,132,706 A | 1/1979 | Doorakian et al. |
| 4,171,420 A | 10/1979 | Doorakian et al. |

(Continued)

FOREIGN PATENT DOCUMENTS

| | | |
|---|---|---|
| EP | 1788048 B1 | 10/2010 |
| JP | 1994172498 A | 6/1994 |

(Continued)

OTHER PUBLICATIONS

Horst, Krase, EP0047364-Abstract, "Use of hardenable resin mixtures for printing inks", May 29, 1985, Claims.

(Continued)

*Primary Examiner* — Megan McCulley
(74) *Attorney, Agent, or Firm* — Hong J. Xu

(57) ABSTRACT

A two-component curable epoxy resin system is disclosed. The resin system includes an epoxy resin component containing at least 80% by weight of a polyglycidyl ether of a polyphenol that has an epoxy equivalent weight of up to about 200 and contains no more than 2% by weight of monohydrolyzed resin species. The system also includes a hardener mixture that has an amino hydrogen equivalent weight of from 35 to 90 and contains at least 90% by weight of a mixture of (i) from 5 to 75% of the combined weight of (i), (ii) and (iii) of one or more compounds that have at least two primary and/or secondary aliphatic amino groups and which have no phenolic groups; (ii) from 10 to 95% of the combined weight of (i), (ii) and (iii) of one or more aminophenol compounds that contain one or more primary and/or secondary aliphatic amino groups and at least one phenolic group and (iii) from 0 to 50% of the combined weight of (i), (ii) and (iii) of one or more phenolic compounds that contain two or more phenolic groups and do not contain primary or secondary amino groups. The epoxy resin component and hardener mixture are present in amounts sufficient to provide from 1.05 to 1.35 equivalents of aliphatic amine hydrogens per equivalent of epoxide groups provided by the epoxy resin component. The system has beneficial curing characteristics that make it useful for producing fiber-reinforced composites in a resin transfer molding process.

20 Claims, No Drawings

(56) References Cited

U.S. PATENT DOCUMENTS

| | | |
|---|---|---|
| 4,177,216 A | 12/1979 | Doorakian et al. |
| 4,302,574 A | 11/1981 | Doorakian et al. |
| 4,320,222 A | 3/1982 | Lopez |
| 4,358,578 A | 11/1982 | Brownscombe |
| 4,366,295 A | 12/1982 | Tyler, Jr. et al. |
| 4,389,520 A | 6/1983 | Gannon |
| 4,922,228 A | 5/1990 | Jacobson |
| 4,992,228 A | 2/1991 | Heck et al. |
| 5,080,551 A | 1/1992 | Jerred |
| 5,112,932 A | 5/1992 | Koenig et al. |
| 5,688,876 A | 11/1997 | Ando et al. |
| 5,698,318 A | 12/1997 | Burton et al. |
| 7,498,389 B2 | 3/2009 | Vogel et al. |
| 2007/0119745 A1 | 5/2007 | Vogel et al. |
| 2008/0308972 A1 | 12/2008 | Fanget |
| 2013/0005853 A1* | 1/2013 | Morley ............... C08G 59/686 523/400 |
| 2015/0240025 A1* | 8/2015 | Grunder ............... B29C 70/48 523/400 |

FOREIGN PATENT DOCUMENTS

| | | |
|---|---|---|
| WO | 9518168 A1 | 7/1995 |
| WO | 2008000730 A1 | 8/2008 |
| WO | 2008140906 A1 | 11/2008 |
| WO | 2008153542 A1 | 12/2008 |
| WO | 2012177392 A1 | 12/2012 |

OTHER PUBLICATIONS

Muraoka, Soya, et al., JP1994172498, Jun. 21, 1994, (machine translation).

* cited by examiner

THERMOSETTING COMPOSITION AND PROCESS FOR PREPARING FIBER-REINFORCED COMPOSITES

This application claims priority from U.S. Provisional Application 61/501,037, filed 24 Jun. 2011.

This invention relates to thermosetting compositions and processes for preparing fiber-reinforced composites.

Epoxy resin formulations are used in a number of processes to form fiber reinforced composites. Among these processes are those known as the resin transfer molding (RTM) process and its variants such as vacuum-assisted resin transfer molding (VARTM) and the Seeman Composites Resin Infusion Molding Process (SCRIMP). In these process, reinforcing fibers are placed into a mold, and a mixture of an epoxy resin component and a hardener is injected into the mold, where it flows around and between the fibers, fills the cavity and cures to form a composite. The epoxy resin and hardener are generally mixed immediately before being injected into the mold. High pressure impingement mixing techniques are used to rapidly mix the epoxy resin with the hardener and transfer it into the mold. These processes are well-adapted for producing large parts having high fiber contents and which may have complex geometries.

The economics of these processes often depends heavily on "cycle time", which can be understood as the time required to produce a molded part and to prepare the equipment to produce the next subsequent part. Therefore, there is a strong desire to reduce cycle time as much as possible, consistent with making parts having acceptable quality.

The time needed to cure the resin in the mold is often a large component of the cycle time. Therefore, significant reductions in cycle time can be achieved, in principle, by providing a resin system that cures very rapidly. There are various ways to promote fast cure; this can be achieved, for example, through the use of catalysts or highly reactive hardeners. But there are other problems associated with faster curing systems such as these. One problem is simply cost, as catalysts and special hardeners tend to be expensive relative to the remainder of the raw materials. In addition, systems that cure more rapidly tend to develop high viscosities very rapidly. This becomes a very significant problem as one increases the reactivity of the system more and more to reduce cure times as much as possible. If the system cures too rapidly, it becomes difficult or impossible to produce parts that have acceptable quality. The system builds viscosity so quickly that it can become difficult to fill the mold, especially when making larger parts. Higher operating pressures become needed, leading to greater equipment and operating costs. Even in smaller parts, visible flow lines and voids often form as the curing polymer flows between and around the fibers. This leads to a loss of physical properties and the part that is produced in addition has aesthetic defects.

The problem of premature viscosity increase is especially acute in some fiber-reinforced composite manufacturing processes. This is because the fibers are often at least partially pre-heated. The introduction of the resin mixture into the mold exposes the resin to rapid localized heating at the points of contact with the heated fibers. This results in rapid localized curing and concomitant localized increases in viscosity. These localized viscosity increases favor the propensity to form defective parts.

Delayed action catalysts have been tried in attempts to circumvent these problems. However, many delayed action catalysts simply do not provide the short demold times that are needed. Other delayed action catalysts become activated at temperatures that are at or near the temperature of the fibers in the mold when the resin is injected. In the latter case, the delayed action catalyst can become locally activated at points where the resin contacts the fibers, leading to localized curing and viscosity increases, which in turn leads to defects in the parts.

What is desired is a method for producing good quality fiber-reinforced epoxy resin composites with short cycle times.

The invention is in one aspect a curable epoxy resin system, comprising

I. an epoxy resin component containing at least 80% by weight of a polyglycidyl ether of a polyphenol that has an epoxy equivalent weight of up to about 250 and contains no more than 3% by weight of monohydrolyzed resin species;

II. a hardener mixture that has an amino hydrogen equivalent weight of from 25 to 90 and contains at least 90% by weight of a mixture of (i) from 5 to 75% of the combined weight of (i), (ii) and (iii) of one or more compounds that have at least two primary and/or secondary aliphatic or cycloaliphatic amino groups and which have no phenolic groups; (ii) from 10 to 95% of the combined weight of (i), (ii) and (iii) of one or more aminophenol compounds that contain one or more primary and/or secondary aliphatic or cycloaliphaic amino groups and at least one phenolic group and (iii) from 0 to 50% of the combined weight of (i), (ii) and (iii) of one or more phenolic compounds that contain two or more phenolic groups and do not contain primary or secondary amino groups; components I and II being present in amounts sufficient to provide from 1.05 to 1.35 equivalents of aliphatic or cycloaliphatic amine hydrogens per equivalent of epoxide groups provided by the epoxy resin component.

This invention is in another aspect a process for forming a fiber-reinforced epoxy composite, comprising;

a) pre-heating an epoxy resin component to a temperature of about 30 to 150° C.;

b) mixing the pre-heated epoxy resin component with a hardener by impingement mixing and transferring the resulting mixture into a mold that contains reinforcing fibers, and c) curing the mixture in the mold to form the fiber-reinforced epoxy composite, wherein;

1) the epoxy resin component contains at least 80% by weight of a polyglycidyl ether of a polyphenol that has an epoxy equivalent weight of up to about 250, and the epoxy resin component contains no more than 3% by weight of monohydrolyzed resin species;

2) the hardener is at a temperature of no greater than 80° C. when mixed with the pre-heated epoxy resin component;

3) the mold is preheated to a temperature of at least 70° C. when the mixture of the epoxy resin component and the hardener is transferred into the mold;

4) the hardener is a mixture that has an amino hydrogen equivalent weight of from 25 to 90 and which contains at least 90% by weight of (i) from 5 to 75% of the combined weight of (i), (ii) and (iii) of one or more compounds that have at least two primary and/or secondary aliphatic or cycloaliphatic amino groups and which have no phenolic groups; (ii) from 10 to 95% of the combined weight (i), (ii) and (iii) of one or more aminophenol compounds that contain one or more primary and/or secondary aliphatic or cycloaliphatic amino groups and at least one phenolic group and (iii) from 0 to 50% of the combined weight of (i), (ii) and (iii) of one or more phenolic compounds that contain two or more phenolic groups and do not contain primary or secondary amino groups; and 5) the ratio of the epoxy resin component and the hardener is such that from 1.05 to 1.35 equivalents of aliphatic or cycloaliphatic amine hydrogens are provided by the hardener per equivalent of epoxide groups provided by the epoxy resin component.

The curable epoxy resin system and process of the invention provides an excellent combination of open time, during which the resin/hardener mixture does not rapidly build in viscosity and so can be transferred into the mold, followed by a fast cure. Cure times tend to be very short. However, during the first stages of cure, the reaction mixture tends to be low enough in viscosity that it can be transferred easily into the mold or resin bath, where it readily flows around the reinforcing fibers to produce a product having few voids or flow lines. On the curing evaluation test described below, cure times of 200 seconds or less are often seen, while gel times on the same test are typically in the range of 50 to 80 seconds. Such a curing profile on the curing evaluation test has been found to correlate well to the curing profile seen when the resin/hardener combination is used to make composites in accordance with the invention. Because of these advantages, the process of the invention is useful for producing a wide variety of composite products, of which automotive and aerospace components are notable examples.

In the invention, the epoxy resin component contains one or more epoxy resins, by which it is meant compounds having an average of about two or more epoxide groups that are curable by reaction with a primary or secondary amine. At least 80% by weight of the epoxy resin component is one or more polyglycidyl ethers of a polyphenol that has an epoxy equivalent weight of up to about 250. Other epoxy resins as described below may constitute up to 20%, preferably from zero to 10% and more preferably from zero to 5% by weight of the epoxy resin component. The polyglycidyl ether of a polyphenol is most preferably the only epoxy resin in the epoxy resin component.

The polyglycidyl ether of the polyphenol may be a diglycidyl ether of a diphenol such as, for example, resorcinol, catechol, hydroquinone, bisphenol, bisphenol A, bisphenol AP (1,1-bis(4-hydroxylphenyl)-1-phenyl ethane), bisphenol F, bisphenol K, tetramethylbiphenol, or mixtures of two or more thereof. The polyglycidyl ether of the polyphenol may be advanced, provided that the epoxy equivalent weight is about 200 or less.

Suitable polyglycidyl ethers of polyhydric phenols include those represented by structure (I)

ethers of polyglycols; epoxy novolac resins including cresol-formaldehyde novolac epoxy resins, phenol-formaldehyde novolac epoxy resins and bisphenol A novolac epoxy resins; cycloaliphatic epoxides; tris(glycidyloxyphenyl)methane; tetrakis(glycidyloxyphenyl)ethane; tetraglycidyl diaminodiphenylmethane; oxazolidone-containing compounds as described in U.S. Pat. No. 5,112,932; and advanced epoxy-isocyanate copolymers such as those sold commercially as D.E.R.™ 592 and D.E.R.™ 6508 (The Dow Chemical Company).

Still other useful epoxy resins are described, for example, in WO 2008/140906.

The epoxy resin component contains no more than 3%, preferably no more than 2% and still more preferably no more than 1% by weight of monohydrolyzed resin species. Monohydrolyzed resin species are a-glycol compounds formed by the addition of a molecule of water to an epoxide group. The presence of significant quantities of monohydrolyzed species tends to increase the viscosity of the epoxy resin component, and in turn that of the epoxy resin/hardener mixture. In addition, it is believed that these species may contribute to a reduction in open time.

The epoxy resin component may contain optional ingredients. Among these are solvents or reactive diluents such as are described in WO 2008/140906, pigments, antioxidants, preservatives, impact modifiers, short (up to about 6 inches (15.24 cm) in length, preferably up to 2 inches (5.08 cm) in length, more preferably up to about ½ inch (1.27 cm) in length) reinforcing fibers, non-fibrous particulate fillers including micron- and nano-particles, wetting agents and the like. An electroconductive filler may be present in the epoxy resin component.

Suitable solvents include, for example, glycol ethers such as ethylene glycol methyl ether and propylene glycol monomethyl ether; glycol ether esters such as ethylene glycol monomethyl ether acetate and propylene glycol monomethyl ether acetate; poly(ethylene oxide)ethers and poly(propylene oxide)ethers; polyethylene oxide ether esters and polypropylene oxide ether esters; amides such as N,N-dimethylformamide; aromatic hydrocarbons toluene and xylene; aliphatic hydrocarbons; cyclic ethers; halogenated hydrocarbons; and mixtures thereof.

Suitable impact modifiers include natural or synthetic polymers having a $T_g$ of lower than −40° C. These include

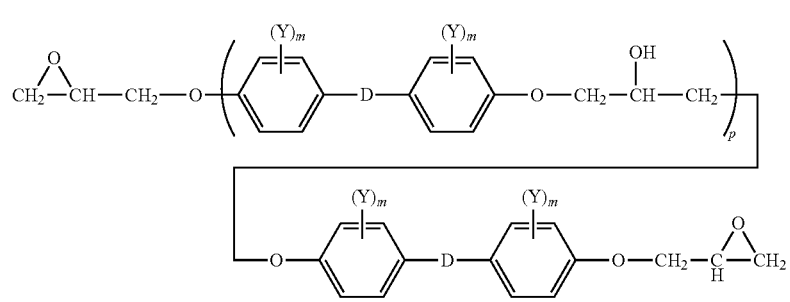

(I)

wherein each Y is independently a halogen atom, each D is a divalent hydrocarbon group suitably having from 1 to about 10, preferably from 1 to about 5, more preferably from 1 to about 3 carbon atoms, —S—, —S—S—, —SO—, —SO$_2$, —CO$_3$. —CO— or —O—, each m may be 0, 1, 2, 3 or 4 and p is a number from 0 to 5, especially from 0 to 2.

Among the other epoxy resins that may be present in the epoxy resin composition are, for example, polyglycidyl natural rubber, styrene-butadiene rubbers, polybutadiene rubbers, isoprene rubbers, butylene oxide-ethylene oxide block copolymers, core-shell rubbers, and the like. The rubbers are preferably present in the form of small particles that become dispersed in the polymer phase of the composite. The rubber particles can be dispersed within the epoxy resin or hardener and preheated together with the epoxy resin or hardener prior to forming the hot reaction mixture.

The hardener mixture used in this invention contains (i) one or more compounds that have at least two primary and/or secondary aliphatic or cycloaliphatic amino groups and which have no phenolic groups. "Aliphatic" amino groups are those in which the nitrogen atom is attached to an aliphatic carbon atom that does not form part of a cycloaliphatic ring; "cycloaliphatic" amine groups are those in which the nitrogen atom is attached to a carbon atom that forms part of a cycloaliphatic ring. Examples of suitable aliphatic and cycloaliphatic amine hardeners include ethylene diamine, diethylene triamine, triethylenetetraamine, tetraethylenepentamine, aminoethylpiperazine, 2-methylpentane-1,5-diamine, N',N'-bis(2-aminoethyl)ethane-1,2-diamine, polyethylene polyamine mixtures, methylene bis(cyclohexylamine), 1,2-, 1,3- and/or 1,4-bis(aminomethyl)cyclohexane, an aminocyclohexanealkylamine, 2- and/or 4-alkylcyclohexane-1,3-diamine, isophorone diamine and the like. Diethylene triamine is a preferred aliphatic amine hardener.

The hardener mixture also contains (ii) one or more aminophenol compounds that contain one or more primary and/or secondary aliphatic or cycloaliphatic amino groups and at least one phenolic group. These aminophenol compounds preferably contain an average of from 1 to 2, especially 2 phenolic groups/compound and an average of at least two, more preferably from 2 to 4 aliphatic or cycloaliphatic primary or secondary amino groups. The aminophenol compounds preferably contain on average from 2 to 10, more preferably from 3 to 6, aliphatic or cycloaliphatic amine hydrogen atoms.

The aminophenol compound in some embodiments corresponds to a so-called "Mannich base" of one or more of the aliphatic or cycloaliphatic amine(s) that form component (i) of the hardener mixture with one or more monophenols or, preferably, a polyphenol. The polyphenol in this case is preferably a phenolic compound or compounds that form component (iii) of the hardener mixture. A "Mannich base" is a reaction product of the aliphatic amine, phenol and an aldehyde which is preferably formaldehyde or a formaldehyde precursor. The Mannich reaction bonds an amine nitrogen of the aliphatic amine to a carbon atom alpha or para to a phenolic hydroxyl group of the phenol or polyphenol through a methylene group (in the case of formaldehyde) or substituted methylene group (in the case of a higher aldehyde).

The hardener may also contain (iii) one or more phenolic compounds that contain two or more phenolic groups and do not contain primary or secondary amino groups. Suitable phenolic compounds include those represented by the structure

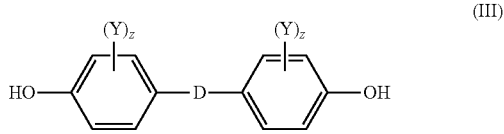

(III)

where each Y independently represents a halogen atom, each z is independently a number from 0 to 4 and D is a divalent hydrocarbon group as described with regard to structure I above. Examples of suitable phenolic compounds include dihydric phenols such as bisphenol A, bisphenol K, bisphenol F, bisphenol S and bisphenol AD. Phenolic compounds having three or more phenolic groups, such as tetraphenol ethane, phenol novolacs or bisphenol A novolacs may also be used. Additional useful phenolic compounds include those described in WO 2008/140906.

The aliphatic amine (i) constitutes from 5 to 75%, preferably from 35 to 75%, of the combined weight of components (i), (ii) and (iii) of the weight of the hardener mixture. The aminophenol compound (ii) constitutes from 10 to 95%, preferably from 10 to 65%, more preferably from 10 to 35%, of the combined weights of components (i), (ii) and (iii). The phenolic compound may be absent, and if present, may constitute up to 50% of the combined weight of components (i), (ii) and (iii). The phenolic compound preferably constitutes at least 5%, at least 10%, at least 15% or even at least 20% of the combined weight of components (i), (ii) and (iii). The phenolic compound may constitute up to 40% up to 35% or up to 30% of the combined weights of components (i), (ii) and (iii).

A mixture of components (i), (ii) and (iii) can be formed by forming a mixture of the aliphatic or cycloaliphatic amine (i) and polyphenol (iii) and performing a Mannich condensation of a portion of those materials with formaldehyde (or formaldehyde precursor) or other aldehyde. The extent of aminophenol formation in such reaction is controlled through the amount of aldehyde and the extent to which the reaction is permitted to proceed, to produce a mixture of components (i), (ii) and (iii) in the proportions described above.

The hardener mixture contains at least 90%, preferably at least 95% and still more preferably at least 98% by weight of the aforementioned mixture of components (i), (ii) and (iii). Components (i)-(iii) may constitute 100% of the total weight the hardener mixture.

The hardener mixture may contain up to 10% by weight of materials other than components (i), (ii) and (iii). Additional hardeners may be present, although they are not preferred. Examples of such additional hardeners include aromatic amines such as dicyandiamide, phenylene diamine, methylene dianiline, mixtures of methylene dianiline and polymethylene polyaniline compounds (sometimes referred to as PMDA, including commercially available products such as DL-50 from Air Products and Chemicals), diethyltoluenediamine, and diaminodiphenylsulfone. Amino-functional polyamides such as those marketed as Versamide® 100, 115, 125 and 140, from Henkel, and Ancamide® 100, 220, 260A and 350A, from Air Products and Chemicals, can be present. Anhydride hardeners such as styrene-maleic anhydride copolymers, nadic methyl anhydride, hexahydrophthalic anhydride, methylhexahydrophthalic anhydride, trimellitic anhydride, dodecyl succinic anhydride, phthalic anhydride, methyltetrahydrophthalic anhydride and tetrahydrophthalic anhydride are useful. Isocyanate hardeners that can be used include toluene diisocyanate, methylene diphenyldiisocyanate, hydrogenated toluene diisocyanate, hydrogenated methylene diphenyldiisocyanate, polymethylene polyphenylene polyisocyanates (and mixtures thereof with methylene diphenyldiisocyanate, commonly known as "polymeric MDI"), isophorone diisocyanate, and the like. Still other additional hardeners include hardeners described in WO 2008/140906.

Other optional components that can be present in the hardener mixture include solvents or diluents as described before, pigments, antioxidants, preservatives, impact modifiers as described before, short (up to about 6 inches (15.24 cm) in length, preferably up to 2 inches (5.08 cm) in length, more preferably up to about ½ inch (1.27 cm) in length) reinforcing fibers, non-fibrous particulate fillers including micron- and nanoparticles, wetting agents, internal mold release agents and the like. An electroconductive filler may be present in the hardener mixture.

It is generally preferred to omit catalysts or accelerators (other than the aminophenol and phenolic compound, which may have some catalytic activity) from the epoxy resin composition and the hardener mixture. The presence of such added catalysts tends to decrease gel time and, surprisingly, is not necessary with this invention in order to obtain short demold times. If a catalyst is used, the amount of the catalyst used generally ranges from about 0.001 to about 1 weight percent, but preferably no greater than about 0.5 weight percent or no greater than 0.25 weight percent, based on the weight of the epoxy resin(s). If such an added catalyst is used, suitable such catalysts include those described in, for example, U.S. Pat. Nos. 3,306,872, 3,341,580, 3,379,684, 3,477,990, 3,547,881, 3,637,590, 3,843,605, 3,948,855, 3,956,237, 4,048,141, 4,093,650, 4,131,633, 4,132,706, 4,171,420, 4,177,216, 4,302,574, 4,320,222, 4,358,578, 4,366,295, and 4,389,520, and WO 2008/140906, all incorporated herein by reference. Examples of suitable catalysts are imidazoles such as 2-methylimidazole; 2-ethyl-4-methylimidazole; 2-phenyl imidazole; tertiary amines such as triethylamine, tripropylamine, N,N-dimethyl-1-phenylmethaneamine and 2,4,6-tris((dimethylamino)methyl)phenol and tributylamine; phosphonium salts such as ethyltriphenylphosphonium chloride, ethyltriphenylphosphonium bromide and ethyltriphenyl-phosphonium acetate; ammonium salts such as benzyltrimethylammonium chloride and benzyltrimethylammonium hydroxide; various carboxylic acid compounds, and mixtures any two or more thereof.

Composites are made in accordance with the invention by pre-heating the epoxy resin composition to a temperature of about 30 to 150° C., preferably 40 to 150° C. A more preferred temperature is from about 45 to 90° C. and a still more preferred temperature is from 50 to 80° C. The temperature of the hardener mixture is adjusted to a temperature of no greater than 80° C., preferably no greater than 60° C., more preferably no greater than 45° C. and still more preferably no greater than 40° C. The temperature of the hardener mixture is above the melting temperature of the mixture. The temperature preferably is at least 0° C., more preferably at least 10° C. and still more preferably at least 15° C.

The epoxy resin composition and the hardener mixture are then mixed together by impingement mixing and transferred into a mold that contains reinforcing fibers. The components are mixed at ratios that provide from 1.05 to 1.35, preferably from 1.1 to 1.35 and more preferably from 1.1 to 1.2, equivalents of aliphatic or cycloaliphatic amine hydrogens are provided per equivalent of epoxide groups.

In certain embodiments, the epoxy resin component and hardener mixture are separately pumped under pressure into a mixing head where they are forced together at a high velocity resulting in a very rapid mixing of the streams. Operating pressures in high pressure machines may range from 1,000 to 15,000 psi or higher (6.9 to 103.5 MPa or higher), although some low pressure machines can operate at significantly lower pressures. The resulting reaction mixture is then preferably passed through a static mixing device to provide further additional mixing, and then transferred into the mold cavity. The static mixing device may be designed into the mold. This has the advantage of allowing the static mixing device to be opened easily for cleaning.

One or more additional streams may be brought into the mixhead and mixed with the epoxy resin component and the hardener mixture. An example of such an additional stream is an internal mold release agent, which in some embodiments of the invention is brought to the mixhead as a separate stream.

It is generally preferred to cure the epoxy resin and the hardener in the presence of an internal mold release agent. Such an internal mold release agent may constitute up to 5%, more preferably up to about 1% of the total weight of the reaction mixture. Suitable internal mold release agents are well known and commercially available, including those marketed as Marbalease™ by Rexco-USA, Mold-Wiz™ by Axel Plastics Research Laboratories, Inc., Chemlease™ by Chem-Trend, PAT™ by Würtz GmbH, Waterworks Aerospace Release by Zyvax and Kantstik™ by Specialty Products Co. In addition to (or instead of) adding the internal mold release agent at the mixhead, it is also possible to combine such an internal mold release agent into the resin component and/or the hardener before the resin component and the hardener are brought together.

An especially preferred apparatus for conducting the process is a reaction injection molding machine, such as is commonly used to processes large polyurethane and polyurea moldings. Such machines are available commercially from Krauss Maffei Corporation and Cannon USA.

The mold-filling step may be vacuum-assisted, as in a vacuum-assisted resin transfer molding (VARTM) or Seeman Composite Resin Infusion Molding) process.

The mold is typically a metal mold, but it may be ceramic or a polymer composite, provided that the mold is capable of withstanding the pressure and temperature conditions of the molding process. The mold contains one or more inlets, in liquid communication with the mixer(s), through which the reaction mixture is introduced. The mold may contain vents to allow gases to escape as the reaction mixture is injected.

The mold is typically held in a press or other apparatus which allows it to be opened and closed, and which can apply pressure on the mold to keep it closed during the filling and curing operations. The mold or press is provided with means by which heat can be provided.

The mold surface may be treated with an external mold release agent, which may be solvent or water-based.

The mold contains reinforcing fibers. The reinforcing fibers can be continuous fibers or may be cut into various lengths. The fibers can be, if desired, formed into mats or other preforms in which the fibers are woven, entangled, stitched and/or adhered together to form a preform that approximates the size and shape of the finished composite article (or portion thereof that requires reinforcement). Mats of continuous or shorter fibers can be stacked and pressed together, typically with the aid of a tackifier, to form preforms of various thicknesses, if required. Multiple fiber performs can be present in the mold.

Suitable fibers include, for example, glass, quartz, polyamide resins, boron, carbon, wheat straw, hemp, sisal, cotton, bamboo and gel-spun polyethylene fibers.

Suitable tackifiers for preparing preforms (from either continuous or shorter fibers) include heat-softenable polymers such as described, for example, in U.S. Pat. Nos. 4,992,228, 5,080,851 and 5,698,318. The tackifier should be compatible with and/or react with the polymer phase of the composite, so that there is good adhesion between the polymer and reinforcing fibers. A heat-softenable epoxy resin or mixture thereof with a hardener, as described in U.S. Pat. No. 5,698,318, is especially suitable. The tackifier may contain other components, such as one or more catalysts, a thermoplastic polymer, a rubber, or other modifiers.

A sizing or other useful coating may be applied onto the surface of the fibers before or after they are introduced into the mold. A sizing often promotes adhesion between the cured epoxy resin and the fiber surfaces. The sizing in some embodiments may also have a catalytic effect on the reaction between the epoxy resin and the hardener.

In addition to the reinforcing fibers, the mold may contain one or more layers of a core material. Such core materials include, for example, a polymer foam, wood, plywood, metals, various polymeric materials such as polyethylene, polypropylene, another polyolefin, a polyurethane, polystyrene, a polyamide, a polyimide, a polyester, polyvinylchloride and the like, various types of composite materials, and the like, that do not become distorted or degraded at the temperatures encountered during the molding step.

The reinforcing fibers and core material, if any, may be enclosed in a bag or film such as is commonly used in vacuum assisted processes.

Composites made in accordance with the invention may have fiber contents of at least 10 volume percent, preferably at least 25 volume percent or at least 35 volume percent, up to 80 volume percent, preferably up to 70 volume percent, more preferably up to 60 volume percent.

The mold is preheated to a temperature of at least 70° C., preferably at least 80° C. and more preferably at least 90° C., when the epoxy resin-hardener mixture is transferred into the mold. The temperature of the preheated mold may be as high as 200° C., but is more preferably no greater than 150° C. and still more preferably on greater than 130° C. or no greater than 120° C., as the higher preheating temperatures can result in premature viscosity build and lead to product defects. The preheating temperature may be the same temperature as the curing temperature. Mold temperatures herein are expressed as the average of the upper and lower mold temperatures, if different upper and lower mold temperatures are used.

It is preferred to apply heat to the mold to maintain the mold temperature within the aforementioned temperature ranges during the mold-filling process, which may take several seconds up to a minute or more, depending on the size of the mold.

After the mold has been filled, the epoxy resin/hardener mixture is cured in the mold until it has cured enough to be demolded. During the curing step, the mold and its contents should be heated to drive the cure and reduce the demold time. In some embodiments, the mold temperature is at least as high as the glass transition temperature of the cured polymer. In other embodiments, the mold temperature at all times during the curing step is maintained above the glass transition temperature of the polymer at that time in the curing process.

Demolding is performed after the polymer phase of the composite has cured sufficiently to allow the part to be demolded without permanent distortion. It is preferred to cure the part in the mold until the polymer phase has attained a $T_g$ of at least 90° C., preferably at least 100° C. If the temperature of the composite is above the glass transition temperature of the polymer phase, the composite is preferably cooled in the mold to below its glass transition temperature, particularly to at least 25° C. below the glass transition temperature, prior to demolding the composite.

An advantage of this invention is that short demold times are seen in most cases. Demold times in any particular case will of course depend on a number of factors, including the various temperature conditions employed in the preheating of components and in the curing steps, as well as the size of the part and its particular dimensions, and the amount of reinforcing fiber that is present in the composite. However, in many cases, the reaction mixture cures rapidly enough under conditions in accordance with the invention that the composite can be demolded within 10 minutes, within 5 minutes and within 3 minutes or even within 2 minutes, after the epoxy resin component and the hardener mixture are mixed. Consequently, in-mold residence times are typically no greater than 10 minutes and preferably no more than 5 minutes and more preferably no more than 3 minutes and still more preferably no more than 2 minutes. In the case of very large parts, longer demold times may be needed.

Because gel and demold times during the production of actual composites can vary quite substantially depending on various factors, it is convenient for purposes of comparison to express gel and demold times for a particular thermosetting system by reference to a standard test method. Accordingly, gel time and demold times, for purposes of this invention are evaluated according to the following curing evaluation test: the epoxy resin and hardener mixture are separately brought to room temperature (22-25° C.) and then mixed for 30 seconds. Optional materials can be added to either the epoxy resin or hardener mixture (or both) either before or at the same time that the epoxy resin and hardener are mixed. The resulting mixture is poured onto a hot plate preheated to 90° C. to form a disk of liquid 15-20 cm in diameter on the surface of the plate. Time is measured from the point at which the mixture contacts the hot plate surface. The hot plate is maintained at 90° C. as the mixture cures. A line is scored through the liquid disk periodically, using a pallet knife or similar blade. The gel time is the time after which the liquid material would no longer flow into the scored line. Demold time is the time after pouring at which the disk can be removed from the hot plate surface as a solid, using the pallet knife or similar blade.

In this invention, the epoxy resin composition/hardener mixture preferably exhibits a gel time of at least 60 seconds on the curing evaluation test. The gel time preferably is not greater than 90 seconds and more preferably not greater than 75 seconds on this test. The demold time on the curing evaluation test is preferably no greater than 210 seconds and more preferably no greater than 190 seconds on the curing evaluation test. An especially preferred epoxy resin composition/hardener mixture exhibits a gel time of from 60 to 75 seconds, and a demold time of from 120 to 210 seconds, especially from 150 to 190 seconds, on the curing evaluation test.

The process of the invention is useful to make a wide variety of composite products, including various types of automotive parts. Examples of these automotive parts include structural elements such as automobile and truck chassis components and bumper beams, vertical and horizontal body panels, and so-called "body-in-white" structural components.

Automobile and truck chassis components made in accordance with the invention offer significant weight reductions compared to steel. This advantage is of most significance in large truck applications, in which the weight savings translate into larger vehicle payload. Automotive chassis components provide not only structural strength, but in many cases (such as floor modules) provide vibration and sound abatement.

Body panel applications include fenders, door skins, hoods, roof skins, decklids, tailgates and the like. Body panels often require a so-called "class A" automotive surface which has a high distinctness of image (DOI). For this reason, the filler in many body panel applications will include a material such as mica or wollastonite. An impact modifier as described before is often desired in body panel applications to toughen the parts.

The following examples are provided to illustrate the invention, but not limit the scope thereof. All parts and percentages are by weight unless otherwise indicated.

EXAMPLES 1-4 AND COMPARATIVE SAMPLES
C1-C13

Various combinations of epoxy resin and hardener are evaluated on the curing evaluation test described above. In some cases, the hot plate temperature is 95° C. rather than 90° C., as noted in Table 1 below. The epoxy resin composition contains an epoxy resin as indicated in Table 1 and an internal mold release. The epoxy resin and internal mold release are in each case mixed for 30 seconds before the hardener mixture is added.

The epoxy resins and hardeners used in Examples 1-4 and Comparative Samples C1-C13 are as follows:

Epoxy Resin A is a diglycidyl ether of bisphenol A, having an epoxy equivalent weight of about 180 and less than 1% by weight of monohydrolyzed resin.

Epoxy Resin B is a diglycidyl ether of bisphenol A, having an epoxy equivalent weight of about 178 and less than 0.5% by weight of monohydrolyzed resin.

Epoxy Resin C is a diglycidyl ether of bisphenol A, having an epoxy equivalent weight of about 189 and about 5% by weight of monohydrolyzed resin.

Hardener A is a mixture that contains about 25% by weight bisphenol A, 14% by weight of a Mannich base of bisphenol A, formaldehyde and diethylene triamine, and about 61% diethylene triamine.

Hardener B is a blend of about 35 weight percent bisphenol A and 65 weight percent diethylene trimamine.

Hardener C is a blend of about 50 weight percent bisphenol A and 50 weight percent diethylene triamine.

Hardener D is a mixture of bisphenol A, benzene-1,3-dimethanediamine (MXDA) and a Mannich reaction product thereof, having an amine hydrogen equivalent weight of about 73.

Hardener E is blend of about 50 weight percent bisphenol A and 50 weight percent MXDA.

Hardener F is a diglycidyl ether of bisphenol A extended with diethylene triamine to an amine hydrogen equivalent weight of 42-47.

Table 1 describes the components and their amounts for each of Examples 1-4 and Comparative Samples C1-C13, and the gel times and demold times as determined according to the curing evaluation test.

TABLE 1

| Sample | Epoxy Resin, type/pbw[1] | IMR, pbw | Hardener, type/pbw | Ratio[2] | Temp., °C. | Gel time, s | Demold time, s |
|---|---|---|---|---|---|---|---|
| 1 | B 33.34 | 0.69 | A 8.76 | 1.2 | 90 | 70 | 180 |
| C1* | A 35.7 | 0.77 | A 7.83 | 1.0 | 95 | 65 | 240 |
| 2 | A 33.3 | 0.70 | A 8.55 | 1.1 | 95 | 62 | 180 |
| 3 | A 33.3 | 0.69 | A 9.42 | 1.2 | 95 | 60 | 180 |
| 4 | A 33.3 | 0.67 | A 10.5 | 1.35 | 95 | 60 | 180 |
| C2* | B 33.34 | 0.69 | B 5.82 | 1.0 | 90 | 85 | 259 |
| C3* | B 33.34 | 0.68 | B 6.81 | 1.2 | 90 | 65 | 255 |
| C4* | A 33.34 | 0.68 | C 7.76 | 1.0 | 90 | 50 | 190 |
| C5* | A 33.27 | 0.69 | C 9.31 | 1.2 | 90 | 42 | 156 |
| C6* | A 33.32 | 0.66 | D 13.8 | 1.0 | 95 | 72 | >240 |
| C7* | A 33.3 | 0.7 | D 18.6 | 1.35 | 95 | 65 | >240 |
| C8* | A 33.29 | 0.70 | E 12.9 | 1.0 | 90 | 63 | >240 |
| C9* | A 33.32 | 0.69 | E 15.2 | 1.2 | 90 | 50 | >240 |
| C10* | B 33.3 | 0.66 | F 8.05 | 1.0 | 90 | 132 | 345 |
| C11* | B 33.3 | 0.66 | F 9.6 | 1.2 | 90 | 116 | 273 |
| C12* | C 33.3 | 0.66 | B 5.3 | 1.0 | 90 | 81 | 405 |
| C13* | C 33.36 | 0.68 | B 6.41 | 1.2 | 90 | 63 | 250 |

[1]pbw means parts by weight.
[2]Number of equivalents of amine hydrogens contributed by the hardener per equivalent of epoxide groups contributed by the epoxy resin.
*Not an example of this invention.

Example 1 illustrates the desirable combination of gel time and demold time that is obtained with this invention.

Examples 2-4 also exhibit the desirable combination of gel time and demold time. Although the curing temperature in this case was 95° C. rather than 90° C., the gel times of these samples at 95° C. all correlate to about 70 seconds at a 90° C. cure. The demold times correlate to about 190-210 seconds at 90° C.

Comparative Sample C1 shows the effect of a 1:1 stoichiometry, in a system that is otherwise identical to Examples 2-4. The gel time is slightly longer but acceptable, but the demold time increases dramatically as compared to Examples 2-4. Examples 2-4 show that the presence of an excess of the hardener greater than 1.1:1 contributes little more in terms of gel time or demold time. The glass transition temperatures of cured Examples 2-4 decrease somewhat with increasing amount of the hardener. The glass transition temperature of Comparative Sample C1 (by differential scanning calorimetry) is about 124° C., whereas those of Examples 1-3 are 115° C., 108° C. and 100° C. These experiments indicate a preference for a ratio of about 1.05 to about 1.2 or about 1.1 to about 1.2, to balance reactivity profile with the thermal properties of the product.

Comparative Samples C2 through C5 are all made with a hardener that contains bisphenol A and diethylene trimine (as does Hardener A), but unlike Hardener A does not contain an aminophenol. Comparative Samples C2 and C3 both exhibit long demold times. Hardener C, which is used in Comparative Samples C4 and C5, contains a higher proportion of bisphenol A than does Hardener B (used in C2 and C3). This causes the gel time to become unacceptably short.

Comparative Samples C6 and C7 show the effect of replacing the aliphatic amine of Hardener A with an aromatic amine (MXDA). The hardener used in these samples contains an aminophenol of bisphenol A and the aromatic amine. Gel times are acceptable, but demold times are unacceptably long.

Comparative Samples C8 and C9 show the effect of using a mixture of bisphenol A and MXDA (without aminophenol) as the hardener. Cure times are quite long, and gel times become unacceptably short when an excess of the hardener is used (Comparative Sample 11).

Comparative Samples C10 and C11 exhibit very long gel times as well as very long demold times.

Comparative Samples C12 and C13 exhibit unacceptably fast gel times, and in addition show the effect of using an epoxy resin having a high level of monohydrolyzed resin species. The demold times of these samples are far longer than those of Comparative Samples C2 and C3, in which the resin has a low content of monohydrolyzed resin.

EXAMPLES 5-8

Epoxy Resin B and a commercially available internal mold release agent are blended at a 100:2 weight ratio. This mixture is heated to 85° C. Hardener mixture A is brought to room temperature (about 22° C.).

Six layers of a 500 mm X 375 mm Zoltek DU carbon fiber mat (from 50 K, mat weight 300 g/m$^2$, total weight 380-385 grams) are stacked into a steel mold which is preheated to 95° C. on the upper half and 91° C. on the lower half.

To produce Composite Example 5, the epoxy resin/internal mold release agent and hardener mixture are processed through a Canon reaction vacuum assisted injection molding machine at pressures of 170 bar on the resin side and 180 bar on the hardener side, at a weight ratio of 100:26. Shot weight is 265 grams; injection time is about 10 seconds. The part is demolded after five minutes. The glass transition temperature of the cured composite is measured and found to be 121° C.

Composite Example 6 is prepared in similar manner, except the Epoxy Resin mixture is preheated to 95° C., the upper and lower mold temperatures are 100° C. and 93° C., respectively, the shot weight is 290 grams and the injection time is about 11 seconds. The demold time is again five minutes. The glass transition temperature of the cured composite is 116° C.

Composite Example 7 is prepared in a manner similar to Example 6, except the demold time is reduced to three minutes. The part demolds easily. The glass transition temperature of the cured composite is 116° C., which indicates that the shorter demold time in this experiment is not achieved at the expense of inadequate cure.

Composite Example 8 is prepared in the same manner as Examples 6 and 7, except the demold time is reduced to only two minutes. The part again demolds easily. The glass transition temperature of the cured composite is 111° C., which shows that adequate cure and development of thermal properties is achieved even at the very short demold time used in this experiment.

These results show that demold times as short as two minutes are achieved while obtaining an adequate cure (as indicated by the development of glass transition temperature to above 110° C.).

What is claimed is:

1. A two-component curable epoxy resin system, comprising
   I. an epoxy resin component containing at least 80% by weight of a polyglycidyl ether of a polyphenol that has an epoxy equivalent weight of up to about 250 and contains no more than 3% by weight of monohydrolyzed resin species;
   II. a hardener mixture that has an amino hydrogen equivalent weight of from 25 to 90 and contains at least 90% by weight of a mixture of (i) from 5 to 75% of the combined weight of (i), (ii) and (iii) of one or more compounds that have at least two primary and/or secondary aliphatic or cycloaliphatic amino groups and which have no phenolic groups; (ii) from 10 to 95% of the combined weight of (i), (ii) and (iii) of one or more aminophenol compounds that contain one or more primary and/or secondary aliphatic or cycloaliphatic amino groups and at least one phenolic group and (iii) from 0 to 50% of the combined weight of (i), (ii) and (iii) of one or more phenolic compounds that contain two or more phenolic groups and do not contain primary or secondary amino groups; components I and II being present in amounts sufficient to provide from 1.05 to 1.35 equivalents of aliphatic or cycloaliphatic amine hydrogens per equivalent of epoxide groups provided by the epoxy resin component.

2. The epoxy resin system of claim 1, wherein the epoxy resin component includes an internal mold release agent.

3. The epoxy resin system of claim 1 or 2, wherein the epoxy resin component contains at least 95% by weight of a diglycidyl ether of a bisphenol.

4. The epoxy resin system of claim 1 wherein component (i) of the hardener mixture is ethylene diamine, diethylene triamine, triethylenetetraamine, tetraethylenepentamine, aminoethylpiperazine, 2-methylpentane-1,5-diamine, N',N' -bis(2 -aminoethyl)ethane -1,2 -diamine, polyethylene polyamine mixtures, methylene bis(cyclohexylamine), 1,2-, 1,3- and/or 1,4-bis(aminomethyl)cyclohexane , an aminocyclohexanealkylamine, 2- and/or 4-alkylcyclohexane-1,3-diamine, isophorone diamine or a mixture of any two or more thereof.

5. The epoxy resin system of claim 4 wherein component (i) of the hardener mixture is triethylenetetramine.

6. The epoxy resin system of any preceding claim 1 wherein component (ii) of the hardener mixture contains an average of from 1 to 2 phenolic groups per molecule and an average of 3 to 6 aliphatic or cycloaliphatic amine hydrogen atoms per molecule.

7. The epoxy resin system of claim 1 wherein component (ii) of the hardener mixture corresponds to a Mannich base of a compound that forms component (i) of the hardener mixture with one or more monophenols or polyphenols.

8. The epoxy resin system of claim 1 wherein the hardener mixture contains from 10 to 30% by weight of component (iii), based on the combined weights of components (i), (ii) and (iii).

9. A process for forming a fiber-reinforced epoxy composite, comprising;
   a) pre-heating an epoxy resin component to a temperature of about 30 to 150° C.;
   b) mixing the pre-heated epoxy resin component with a hardener by impingement mixing and transferring the resulting mixture into a mold that contains reinforcing fibers, and
   c) curing the mixture in the mold to form the fiber-reinforced epoxy composite, wherein;
   1) the epoxy resin component contains at least 80% by weight of a polyglycidyl ether of a polyphenol that has an epoxy equivalent weight of up to about 250, and the epoxy resin component contains no more than 3% by weight of monohydrolyzed resin species;
   2) the hardener is at a temperature of no greater than 60° C. when mixed with the pre-heated epoxy resin component;
   3) the mold is preheated to a temperature of at least 70° C. when the mixture of the epoxy resin and the hardener is transferred into the mold;
   4) the hardener is a mixture that has an amino hydrogen equivalent weight of from 25 to 90 and which contains at least 90% by weight of (i) from 5 to 75% of the combined weight of (i), (ii) and (iii) of one or more compounds that have at least two primary and/or secondary aliphatic or cycloaliphatic amino groups and which have no phenolic groups; (ii) from 10 to 95% of the combined weight (i), (ii) and (iii) of one or more aminophenol compounds that contain one or more primary and/or secondary aliphatic or cycloaliphatic amino groups and at least one phenolic group and (iii) from 0 to 50% of the combined weight of (i), (ii) and (iii) of one or more phenolic compounds that contain two or more phenolic groups and do not contain primary or secondary amino groups; and
   5) the ratio of the epoxy resin component and the hardener is such that from 1.05 to 1.35 equivalents of aliphatic or cycloaliphatic amine hydrogens are provided by the hardener per equivalent of epoxide groups provided by the epoxy resin component.

10. The process of claim 9, wherein the ration of the epoxy resin component and the hardener is such that from 1.1 to 1.2 equivalents of aliphatic or cycloaliphatic amine hydrogens are provided by the hardener per equivalent of epoxide groups provided by the epoxy resin component.

11. The process of claim 9, wherein step c is performed in the presence of an internal mold release agent.

12. The process of claim 9, wherein the epoxy resin component contains at least 95% by weight of a diglycidyl ether of a bisphenol.

13. The process of any of claim 9 wherein component (i) of the hardener mixture is ethylene diamine, diethylene triamine, triethylenetetraamine, tetraethylenepentamine, aminoethylpiperazine, 2-methylpentane-1,5-diamine, N',N'-bis (2-aminoethyl)ethane-1,2-diamine, polyethylene polyamine mixtures, methylene bis(cyclohexylamine), 1,2-,1,3- and/or 1,4-bis(aminomethyl)cyclohexane, an aminocyclohexanealkylamine, 2- and/or 4-alkylcyclohexane-1,3-diamine, isophorone diamine or a mixture of any two or more thereof.

14. The process of claim 13 wherein component (i) of the hardener mixture is triethylenetetramine.

15. The process of claim 9 wherein component (ii) of the hardener mixture contains an average of from 1 to 2 phenolic groups per molecule and an average of 3 to 6 aliphatic or cycloaliphatic amine hydrogen atoms per molecule.

16. The process of claim 9 wherein component (ii) of the hardener mixture corresponds to a Mannich base of a compound that forms component (i) of the hardener mixture with one or more monophenols or polyphenols.

17. The process of claim 9 wherein the hardener mixture contains from 10 to 30% by weight of component (iii), based on the combined weights of components (i), (ii) and (iii).

18. The process of claim 9 wherein the epoxy resin component is preheated to a temperature of at least 80° C.

19. The process of claim 9 wherein the hardener mixture is at a temperature of no greater than 40° C. when mixed with the pre-heated epoxy resin component.

20. The process of claim 9 wherein the composite contains from 25 to 70 volume percent of the reinforcing fibers.

* * * * *